United States Patent [19]

Deutschländer

[11] 4,147,583
[45] Apr. 3, 1979

[54] APPARATUS FOR SEALING AND CUTTING FILLED WRAPPERS

[75] Inventor: Gert Deutschländer, Neuhausen am Rheinfall, Switzerland

[73] Assignee: SIG Schweizerische Industrie-Gesellschaft, Neuhausen am Rheinfall, Switzerland

[21] Appl. No.: 885,071

[22] Filed: Mar. 9, 1978

[30] Foreign Application Priority Data

Mar. 11, 1977 [CH] Switzerland .................. 3125/77

[51] Int. Cl.² .............. B32B 31/00; B65B 61/18; B26D 1/12
[52] U.S. Cl. .................... 156/510; 53/133; 83/663; 83/678; 206/633; 53/548
[58] Field of Search ............ 156/510, 250.1, 515; 83/663, 674, 678; 53/182 R, 128, 133; 206/632, 633

[56] References Cited

U.S. PATENT DOCUMENTS

| | | | |
|---|---|---|---|
| 2,103,389 | 12/1937 | Salfisberg | 206/633 |
| 2,803,100 | 8/1957 | Aalseth | 53/182 |
| 3,196,067 | 7/1965 | Techtmann | 53/133 |
| 3,638,522 | 2/1972 | Bolli | 156/515 |

Primary Examiner—Douglas J. Drummond
Attorney, Agent, or Firm—Spencer & Kaye

[57] ABSTRACT

An apparatus for sealing and cutting a hose-like wrapper having serially arranged filled pockets and transverse zones therebetween includes oppositely rotating, cooperating clamping shoes between which the wrapper passes for pressing together and transversely sealing opposite wrapper walls in the transverse zones by providing a seam therein. A knife is secured to one of the clamping shoes and a backup support is secured to the other of the clamping shoes. The knife has a first cutting edge cooperating with the backup support for transversely separating wrapper packages from one another by providing a severing cut in each transverse zone. The knife further has at least one second cutting edge adjacent the first cutting edge for providing a cut in each transverse zone adjacent the severing cut to facilitate a manual tearing-open of the seams.

5 Claims, 6 Drawing Figures

APPARATUS FOR SEALING AND CUTTING FILLED WRAPPERS

BACKGROUND OF THE INVENTION

This invention relates to a sealing and cutting apparatus for filled hose-like wrappers and is of the type which has two oppositely rotating, cooperating clamping shoes which compress the hose-like wrapper along a zone situated between two filled pockets to thus seal oppositely located wall portions of the hose by providing a seam extending transversely to the length dimension of the hose. One of the clamping shoes carries a knife, while the other clamping shoe has a backup support which engages the knife during each revolution of the clamping shoes. The knife has a linear cutting edge for transversely separating successive packages from one another.

The packages sealed and severed with an apparatus of the above-outlined type have the disadvantage that the consumers often encounter difficulties in opening the transverse seam for emptying the contents.

SUMMARY OF THE INVENTION

It is an object of the invention to provide an improved apparatus of the above-outlined type which cuts packages in such a manner that the discussed disadvantages are eliminated.

This object and others to become apparent as the specification progresses, are accomplished by the invention, according to which, briefly stated, the knife has at least one additional cutting edge which provides a lateral cut next to the throughgoing main cut in order to facilitate the tearing-open of the transverse seam.

DESCRIPTION OF THE PREFERRED EMBODIMENTS

Figure 1:
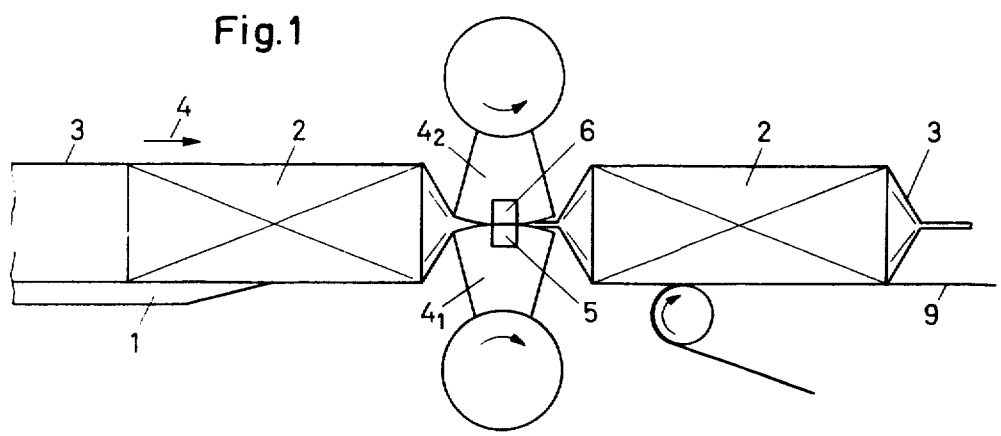
FIG. 1 is a schematic side elevational view of a sealing and cutting apparatus incorporating the invention.

Turning now to FIG. 1, the apparatus shown therein comprises a table 1 on which a continuous wrapper hose 3—filled at uniform distances with goods 2—is advanced in the direction of the arrow 4. Between two successive hose portions filled with goods 2, the hose 3 is compressed by means of two cooperating, oppositely rotating heated clamping shoes $4_1$ and $4_2$ which are elastically pressed to one another. The hot shoes $4_1$ and $4_2$ seal oppositely located wall portions of the hose 3 which is made of a sealable (preferably weldable) material. In a groove of the lower shoe $4_1$ there is inserted a knife 5, whereas in a groove provided in the upper shoe $4_2$ there is embedded a backup support 6 which is engaged by the knife 5 as these two components are oriented towards one another during rotation. After the hose has passed the shoes $4_1$ and $4_2$, it is advanced to a conveyor belt 9. After having passed the sealing and cutting shoes $4_1$ and $4_2$, the wrapper hose 3 is subdivided into individual packages 11 closed by the transverse seams 10 and separated from one another by throughgoing cuts 12.

Figure 2:
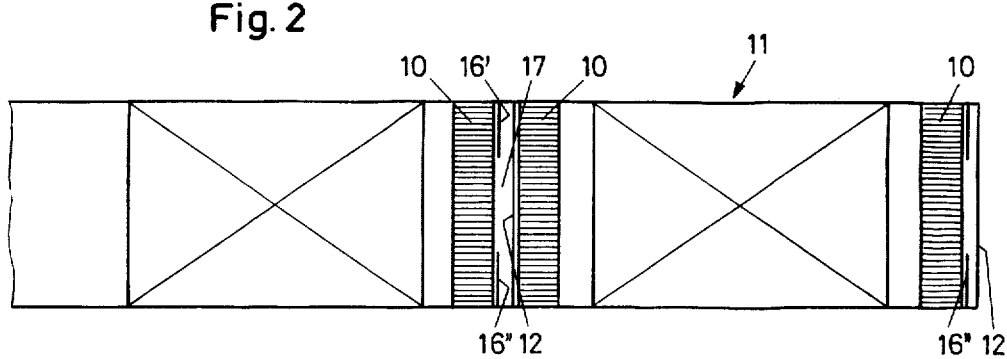
FIG. 2 is a top plan view of the packages sealed and cut by the apparatus shown in FIG. 1.
Figure 3:
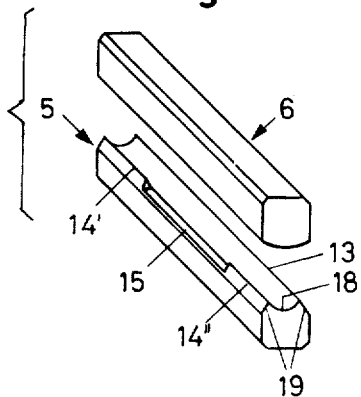
FIG. 3 is a perspective view of a preferred embodiment of the invention.

Turning now to FIG. 3, according to the invention, the knife 5 has, in addition to the cutting edge 13 which provides the throughgoing cut 12 in a conventional manner, two additional cutting edges 14' and 14" which may extend, for example, parallel to the cutting edge 13. Also referring now to FIG. 2, the cutting edges 14' and 14" provide, in cooperation with the backup support 6, two lateral cuts 16' and 16" into the strip 17 which is situated between two immediately adjacent transverse seams 10. the cuts 16' and 16" have the advantage that by pulling on the strip 17, the neighboring seam 10 can be easily torn open, thus opening the hose package 11.

Hose wrappers which are provided at their end with transverse cuts 16' and 16" are known by themselves. For making such cuts, however, a separate, relatively complicated and expensive cutting machine has been arranged heretofore along the output conveyor belt 9.

The parallel cutting edges 13, 14' and 14" are separated by a groove 18 which extends in the length dimension of the knife 5 and which has an arcuate cross section. The cutting edges 13, 14' and 14" are defined by the side walls of the groove 18 and by inclined faces 19 which converge towards one another in the direction of the groove 18. One groove edge has a discontinuity 15 separating the cutting edges 14' and 14". This design permits a simple and very precise manufacture of the knife by turning and milling.

Figure 4:
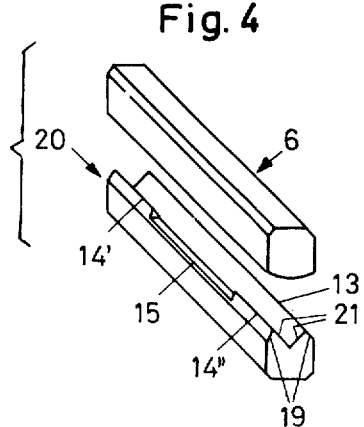
FIG. 4 is a perspective view of another preferred embodiment.

Turning now to FIG. 4, there is illustrated a knife 20 constituting another preferred embodiment of the invention. This embodiment differs from that of FIG. 3 in that the longitudinal groove is formed of outwardly divergent planar side walls 21.

The above-described apparatus is substantially more economical than the arrangement provided heretofore for the same purpose and furthermore, the apparatus according to the invention operates more precisely and in an operationally safer manner. It is noted that in case a cutting device is situated—according to prior art arrangements—next to the output conveyor belt 9, unintended longitudinal shifts of the already severed packages on the belt 9 may cause the cuts 16' and 16" to be provided at locations other than those desired, thus rendering these cuts useless for practical purpose.

Figure 5:
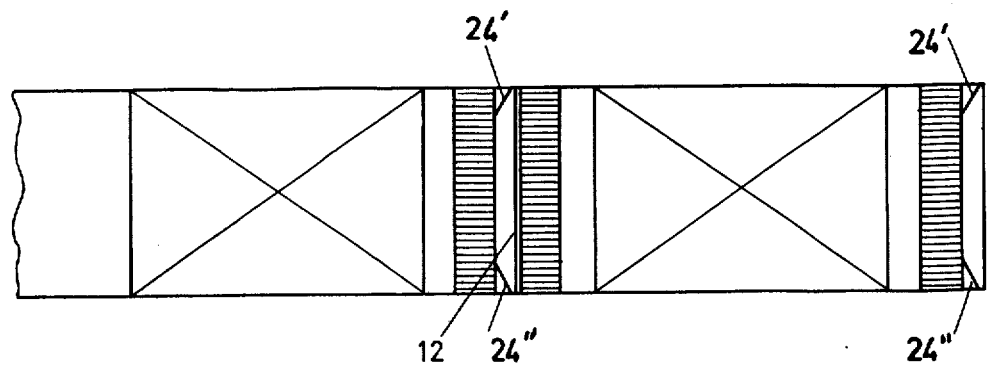
FIG. 5 is a top plan view of packages provided with oblique cuts.
Figure 6:
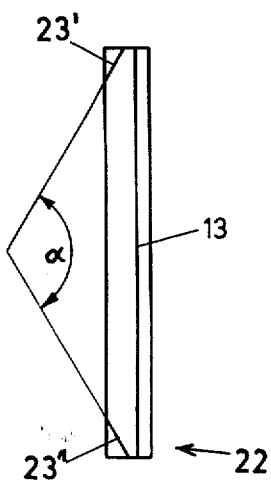
FIG. 6 is a top plan view of still another preferred embodiment of the invention for providing oblique cuts shown in FIG. 5.

Turning now to FIG. 6, there is shown a knife 22 which constitutes a third preferred embodiment of the invention. In this knife structure, the cutting edges 23' and 23" form an obtuse angle $\alpha$, the opening of which is straddled by the cutting edge 13. FIG. 5 illustrates the hose wrappers cut by the knife 22. As before, the throughgoing cut 12 is provided by the edge 13, while the oblique cuts 24' and 24" are provided by the cutting edges 23' and 23", respectively.

It is to be understood that the above description of the present invention is susceptible to various modifications, changes and adaptations, and the same are intended to be comprehended within the meaning and range of the appended claims.

What is claimed is:

1. In an apparatus for sealing and cutting a hose-like wrapper, having serially arranged filled pockets and zones therebetween, including oppositely rotating, cooperating clamping shoes between which the wrapper passes for pressing together and transversely sealing opposite wrapper walls in said zones by providing a seam therein; a knife secured to one of the clamping shoes and a backup support secured to the other clamping shoe; a first cutting edge forming part of the knife and cooperating with the backup support for transversely separating wrapper packages from one another by providing a severing cut in each said zone, the improvement wherein said knife comprising (a) a groove extending in a length dimension of said knife and having parallel-spaced outer first and second groove edges; and (b) external inclined faces extending in said length dimension on either side of said groove and converging towards one another in the direction of said groove; said inclined faces terminating on respective said first and second groove edges; said first cutting edge being constituted by said first groove edge and at least one second cutting edge being constituted by said second groove edge; said at least one second cutting edge providing a cut in each said zone adjacent the severing cut to facilitate a manual tearing-open of said seams.

2. An apparatus as defined in claim 1, further comprising means defining a discontinuity in said second groove edge; said discontinuity dividing said second groove edge into two longitudinally aligned, spaced second cutting edges.

3. An apparatus as defined in claim 1, wherein said groove has a semi-circular cross section.

4. An apparatus as defined in claim 1, wherein said groove is defined by two planar side walls diverging from one another in a direction outwardly from said groove.

5. An apparatus as defined in claim 2, wherein said two second cutting edges are of identical length.

* * * * *